US012604386B2

(12) United States Patent
Su et al.

(10) Patent No.: US 12,604,386 B2
(45) Date of Patent: Apr. 14, 2026

(54) LED CONTROLLER, LED DRIVE SYSTEM AND METHOD

(71) Applicant: Infineon Technologies AG, Neubiberg (DE)

(72) Inventors: Xing Su, Shanghai (CN); Fausto Borghetti, Sant'Ambrogiodi Valpolicella (IT); Enrico Tonazzo, Villanova di Camposampiero (IT)

(73) Assignee: Infineon Technologies AG, Neubiberg (DE)

( * ) Notice: Subject to any disclaimer, the term of this patent is extended or adjusted under 35 U.S.C. 154(b) by 1375 days.

(21) Appl. No.: 17/292,711

(22) Filed: May 10, 2021

(65) Prior Publication Data

US 2025/0280484 A1 Sep. 4, 2025

Related U.S. Application Data

(63) Continuation of application No. PCT/CN2021/087430, filed on Apr. 15, 2021.

(51) Int. Cl.

| | |
|---|---|
| ***H05B 45/30*** | (2020.01) |
| ***H05B 45/345*** | (2020.01) |
| ***H05B 45/375*** | (2020.01) |
| ***H05B 45/54*** | (2020.01) |
| ***H05B 47/10*** | (2020.01) |
| ***H05B 47/14*** | (2020.01) |
| ***H05B 47/155*** | (2020.01) |
| ***H05B 47/16*** | (2020.01) |

(Continued)

(52) U.S. Cl.

CPC ........... *H05B 47/25* (2020.01); *H05B 45/345* (2020.01); *H05B 45/375* (2020.01); *H05B 45/54* (2020.01); *H05B 47/14* (2020.01); *H05B 47/155* (2020.01); *H05B 47/16* (2020.01); *H05B 47/165* (2020.01); *H05B 47/17* (2020.01)

(58) Field of Classification Search

CPC .... H05B 45/30; H05B 45/345; H05B 45/375; H05B 45/54; H05B 47/10; H05B 47/14; H05B 47/16; H05B 47/17; H05B 47/155; H05B 47/165; H05B 47/25

See application file for complete search history.

(56) References Cited

U.S. PATENT DOCUMENTS

| | | | | |
|---|---|---|---|---|
| 2013/0320850 | A1 | 12/2013 | Nakamura | |
| 2016/0262232 | A1* | 9/2016 | Fukui .................. | H05B 45/345 |
| 2018/0283637 | A1* | 10/2018 | Murakami ......... | H05B 45/3725 |

FOREIGN PATENT DOCUMENTS

| | | | | | |
|---|---|---|---|---|---|
| CN | 108696964 | A | | 10/2018 | |
| JP | 2010241347 | A | | 10/2010 | |
| KR | 20150100038 | A | * | 9/2015 | ......... H05B 37/0227 |

OTHER PUBLICATIONS

Office Action from counterpart Chinese Application No. 202210394260.6 dated Feb. 27, 2025, 14 pp.

(Continued)

*Primary Examiner* — Jimmy T Vu

(74) *Attorney, Agent, or Firm* — Shumaker & Sieffert, P.A.

(57) ABSTRACT

Light emitting diode, LED, controllers (110), light-emitting diode drive systems (10) and corresponding methods are provided. A LED arrangement (14) is switchable between a first set of active LEDs (15) and a second set of active LEDS (16). Upon switching, a series switch (13) between a power supply and the LED arrangement is switched off and on repeatedly during a transition period.

16 Claims, 4 Drawing Sheets

(51) Int. Cl.
*H05B 47/165* (2020.01)
*H05B 47/17* (2020.01)
*H05B 47/25* (2020.01)

(56) References Cited

OTHER PUBLICATIONS

Office Action from counterpart German Application No. 102021116684.5 dated Jan. 13, 2022, 9 pp.

* cited by examiner

LED CONTROLLER, LED DRIVE SYSTEM AND METHOD

TECHNICAL FIELD

The present application relates to controllers for supplying light-emitting diodes (LED) with power, corresponding LED drive systems and methods.

BACKGROUND

Light-emitting diodes (LED) have replaced other light sources like light bulbs in many applications, for example in the automotive area for headlights, backlights, winkers and the like. LED drive systems including a power supply are used to provide regulated output current or output voltage to LEDs.

In some applications, such LED drive systems have to be able to cope with changing loads. For example, an automobile headlight may include a so-called high beam LED set and a low beam LED set, where in some situations only the low beam LED set may be used, whereas in other situations both the high beam and the low beam headsets may be used.

When switching from a mode where both high beam and low beam LET sets are used to a mode where only the low beam LED set is used, the overall voltage drop, corresponding to a sum of forward voltages of the individual light-emitting diodes, suddenly decreases. When the light-emitting diodes are supplied by a single current supply, this may result in a current spike, which could damage the LEDS.

A straightforward solution to this problem is to use separate power supplies for the high beam and low beam LED sets. However, this leads to extra costs.

Another approach provides an additional switch for discharging an output capacitance of the power supply to ground when switching between the modes. This requires additional circuitry, i.e. the switch connected to ground, as well as additional pins at a controller for controlling such a switch.

Another approach is to slowly switch a switch device, for example transistor, used for changing between the modes. For example, when only the low beam LED set is active, the high beam diode LED set may be bridged by such a switch. The switch may be turned on slowly (i.e. transitioning through a phase where the switch exhibits a comparatively high resistance) to dissipate the energy of the additional current and reduce a resulting current spike. However, this arrangement may need to be tailored to the specific different loads, and has little flexibility.

SUMMARY

A light-emitting diode controller as defined in claim 1 and a method as defined in claim 13 are provided. The dependent claims define further embodiments as well as a light-emitting diode drive system including such a controller.

According to an embodiment, a light-emitting diode (LED) controller is provided, comprising:

- a control terminal to be coupled to a series switch between a power supply and at least one LED arrangement switchable between a first set of active LEDs and a second set of active LEDS, and
- a control circuit configured to, upon switching from the first set of active LEDs to the second set of active LEDS, output a control signal at the control terminal to repeatedly switch the series switch off and on during a transition period.

According to another embodiment, a method of supplying a light-emitting diode (LED) arrangement with power, comprising:

- operating the LED arrangement with a first set of active LEDS,
- switching the LED arrangement from the first set of active LEDs to a second set of active LEDS,
- in response to the switching of the LED arrangement, repeatedly switching a series switch between a power supply and the LED arrangement off and on during a transition period, and
- operating the LED arrangement with the second set of active LEDs after the transition period.

The above summary is merely intended to give a brief overview over some embodiments and is not to be construed as limiting in any way.

DETAILED DESCRIPTION

Figure 1:
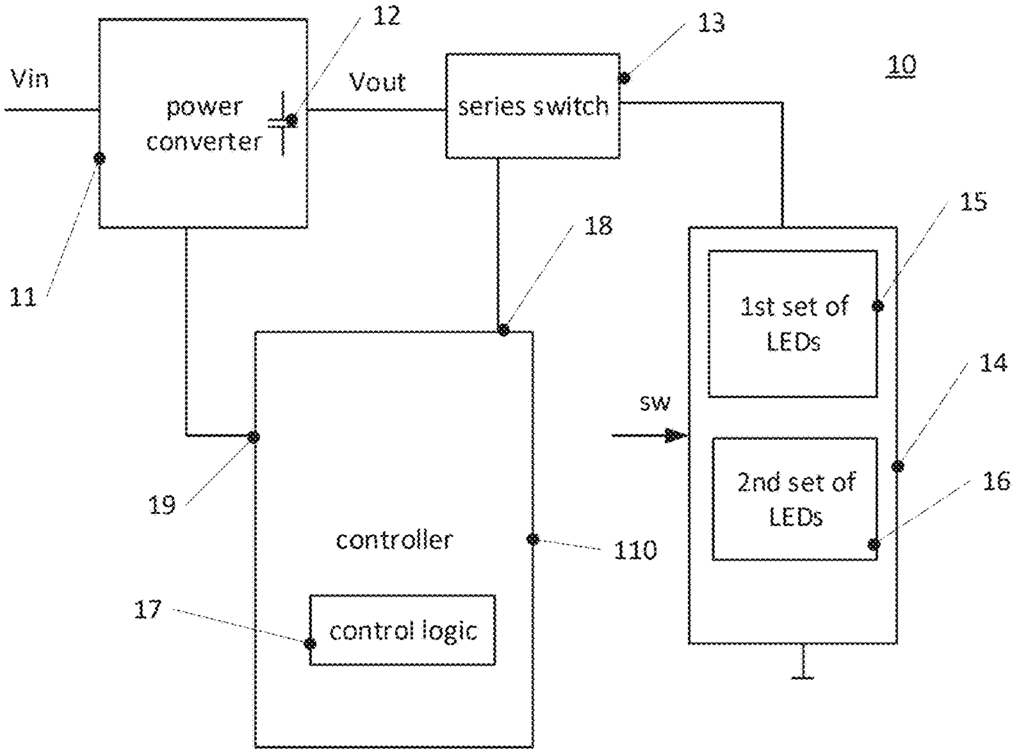
FIG. 1 is a block diagram of a system according to an embodiment.

In the following, various embodiments will be described referring to the attached drawings. These embodiments are given by way of example only and are not to be construed as limiting in any way. For example, while specific features (elements, components, circuit parts, acts, events, method steps etc.) are shown in the drawings and described herein, in other embodiments some of these features may be replaced by alternative features, additional features may be added, or some features may be omitted. For example, embodiments described herein relate to transitioning between two sets of active light-emitting diodes (LEDs), and apart from this transitioning, controllers, systems and methods described herein may be implemented in any conventional manner. For example, current regulation, voltage regulation, protection like overcurrent protection, feedback measurement and the like outside the transitioning between the different sets of active LEDs may be implemented in any conventional manner, and these conventional parts will therefore not be described in greater detail.

Connections or couplings described herein refer to electrical connections or couplings unless noted otherwise. Such connections or couplings may be modified, for example by adding additional elements or removing elements, as long as the general purpose of the connection or coupling, for example to provide a voltage or current, to transmit a signal or to provide a control, is essentially maintained.

A switch as used herein is referred to as off or open when it essentially provides an electric isolation between terminals, and is referred to as on or closed when it provides a low ohmic connection between terminals. Switches may be implemented as transistors, where a control terminal of the transistor (for example base terminal in case of bipolar junction transistors or gate terminal in case of field-effect transistors or insulated gate bipolar transistor) may be used to switch the switch on or off.

Variations and modifications described with respect to one of the embodiments may also be applied to other embodiments unless noted otherwise and will therefore not be described repeatedly. Features from different embodiments may be combined with each other to form further embodiments.

Turning now to the figures, FIG. 1 shows a block diagram of a system 10 according to an embodiment, including a controller 110 according to an embodiment.

System 10 provides an electrical power to a light-emitting diode (LED) arrangement 14. LED arrangement 14 includes a first set of LEDs 15 and a second set of LEDs 16. While the first and second sets of LEDs 15, 16 are depicted as separate boxes in FIG. 1, this is not implying that the two sets 15, 16 are completely separate. For example, in some implementations as will be explained below, the second set of LEDs may be a subset of the first set of LEDs, i.e. the second set of LEDs may include only some of the LEDs of the first set. In other embodiments, the two sets may be completely separate and may for example include LEDs of different colors. In embodiments, the second set of LEDs may have a lower overall forward voltage than the first set of LEDs when the same current is applied. Forward voltage, in this respect, refers to the voltage drop over the diodes when a current is applied. The first set of LEDs having a lower overall forward voltage than the first set of LEDs means that for example, as will be explained below in further detail, the LEDs may be arranged in one or more LED strings, where the LEDs are coupled in series. The first set of LEDs in such a case may include all LEDs of a certain LED string, such that all LEDs contribute to the overall forward voltage. For the second set of LEDs, a part of the LED string may be bridged, such that the second set of LEDs includes only a subset of the LEDs of the first set. As then less LEDS contribute to the overall forward voltage, the overall forward voltage is lower when the same current is applied.

Figure 3:
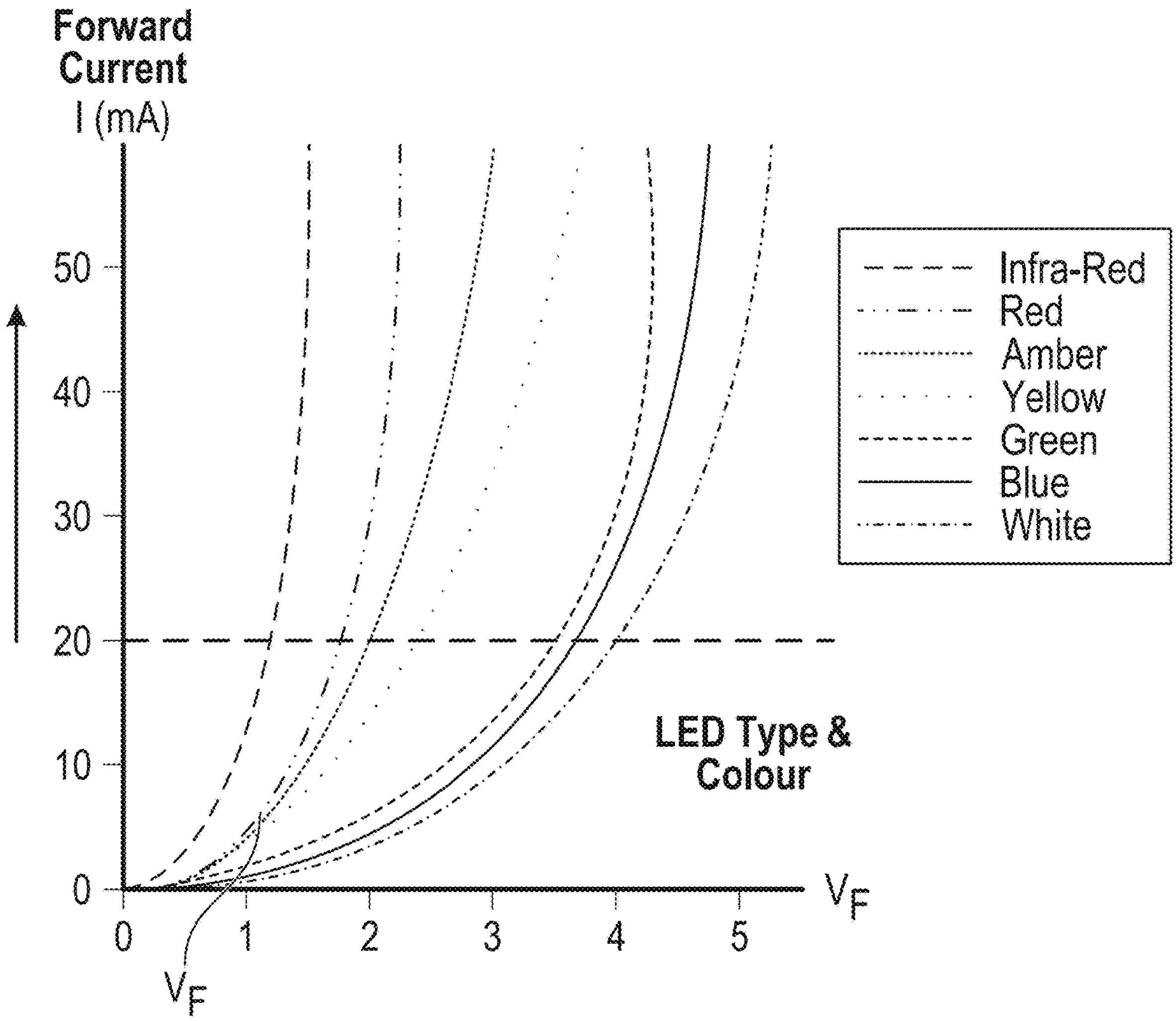
FIG. 3 is a diagram illustrating current-voltage curves for different colors of light-emitting diodes.

In other embodiments, the first set of LEDs may include LEDS of different colors than the second set of LEDs. LEDS of different colors have different forward voltages for the same current. For example, white LEDs generally have higher forward voltages than blue LEDs, which have higher forward voltages than green LEDs etc. This is illustrated in FIG. 3, where current-voltage curves are shown for LEDs of different colors. For example, the second set of LEDs may include red LEDs, while the first set of LEDs may include the same number of LEDs as the second set, but blue LEDs. Consequently, the first set of LEDs has a higher overall forward voltage than the second set of LEDS.

Returning to FIG. 1, using a switch signal sw, either the first set of LEDs or the second set of LEDs may be selected as active LEDs, i.e. as LEDs supplied with power by system 10 such that they emit light.

For supplying LED arrangement 14 with power, system 10 receives an input voltage Vin. In an automotive environment, input voltage Vin may for example be a voltage received from a battery of an automobile. In other applications, for example stationary applications, Vin may be a mains voltage.

Voltage Vin is provided to a power converter 11, which converts the input voltage Vin to an output voltage Vout appropriate for LED arrangement 14. Power converter 11 may be any kind of suitable power converter for converting the input voltage Vin to the output voltage Vout, including a buck converter, boost converter, buck-boost converter, converter with galvanic isolation (using for example a transformer) like resonant converters, flyback converters etc. Power converter 11 may include an output capacitor 12, at which the output voltage Vout is tapped. Power converter 11 may include one or more main switches which are selectively switched on and off to regulate the amount of power output by power converter 11, for example regulate the voltage Vout or an output current.

Power converter 11 is controlled by controller 110, for example a control logic 17 thereof, via an output terminal 19 of controller 110. For example, controller 110 may control switching of the one or more main switches mentioned above. This control may be implemented in any conventional manner and may be used to control power converter 11 to regulate the output voltage or to regulate the output current to a predefined level appropriate for LED arrangement 14. To this end, controller 110 may receive a feedback regarding the output voltage Vout or regarding an output current supplied to LED arrangement 14. This control may be implemented in any conventional manner used for supplying LED loads with power.

Output voltage Vout is provided to LED arrangement 14 via a series switch 13, for example a transistor switch. Series switch 13 is controlled by controller 110, for example control logic 17, via a control terminal 18.

Such a series switch is provided in some conventional systems for example for overcurrent protection during normal operation. Normal operation, as used herein, refers to an operation of the system where the first set of LEDs is supplied with power, or where the second set of LEDs is supplied with power, outside and transition periods where a switch between the first set and the second set occurs. Series switch 13 may also be used for other conventional purposes in normal operation, for example to provide LED arrangement 14 with a pulsed or a otherwise modulated output voltage.

In embodiments discussed herein, series switch 13, alternatively or in addition to such conventional uses, is also used when led arrangement 14 is switched from the first set of LEDs 15 as active LEDs to the second set of LEDs 16 as active LEDs.

In embodiments, when switching from the first set of LEDs to the second set of LEDs, the forward voltage at the same current decreases. Conversely, when switching from the first set of LEDs to the second set of LEDs at a certain output voltage Vout, this means that the current rapidly increases. This can be seen when looking at the curves in FIG. 3. Generally, for LEDs, as can be seen in FIG. 3, the current does not increase linearly with voltage, but increases in an almost exponential manner. This means that when for example the first set of LEDs are blue LEDs and the second set of LEDs are red LEDs, at the moment of switching the current would increase so steeply that it might destroy the LEDS. Similar considerations may apply when bridging a part of a LED string, as mentioned above.

Furthermore, with most power converters an abrupt change of the output voltage is not easily possible, as the output voltage power Vout is provided at output capacitor 12, and output capacitor 12 in this case first has to be discharged to a lower output voltage.

In embodiments, discussed herein, series switch 13 is repeatedly switched off and on during a transition period when switching between the first set of LEDs 15 and the second LEDs 16 as active LEDs, until the current provided to LED arrangement 14 is below a threshold level and/or the output voltage Vout has been regulated to a level required for the second set of LEDS.

Figure 2:
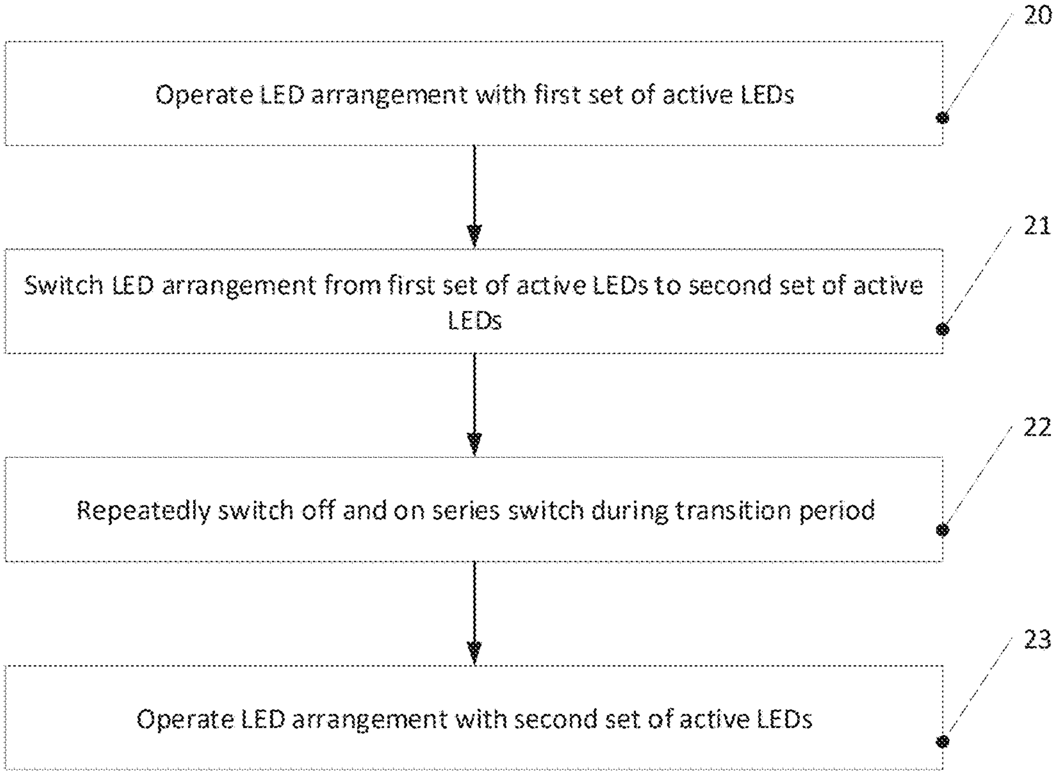
FIG. 2 is a flowchart illustrating a method according to an embodiment.

This operation is illustrated in FIG. 2, which is a flowchart illustrating a method according to some embodiments. The method of FIG. 2 may be implemented in system 10 of FIG. 1 and will be described referring to the explanations already made for FIG. 1 to avoid repetitions. However, the method of FIG. 2 may also be implemented in other systems, for example the system of FIG. 6 that will be described further below.

At 20, the method comprises operating an LED arrangement with a first set of active LEDs, for example first set 15 of FIG. 1 being active. At 21, the method comprises switching the LED arrangement from the first set of active LEDs to a second set of active LEDs. For example, controlled by switch signal sw, LED arrangement 14 may be switched such that not the first set of LEDs 15 is supplied with power, but the second set of LEDs 16 is supplied with power.

At 22, the method comprises repeatedly switching off and on a series switch like series switch 13 during a transition period following the switching of the LED arrangement at 21. The transition period may last until an output current provided to the second set of LEDs remains below a threshold. Repeatedly switching off and on the series switch may serve to discharge an output capacitor of a power converter like output capacitor 12 without exceeding an output current threshold, thus preventing damage of the LEDs.

After the transition period, at 23 the LED arrangement is then operated with the second set of active LEDs, or, in other words, with the second set of LEDs being supplied with electrical power such they emit light.

Various schemes may be used for repeatedly switching off and on the series switch during the transition period. Examples will now be explained with reference to FIGS. 4 and 5.

Figure 4:
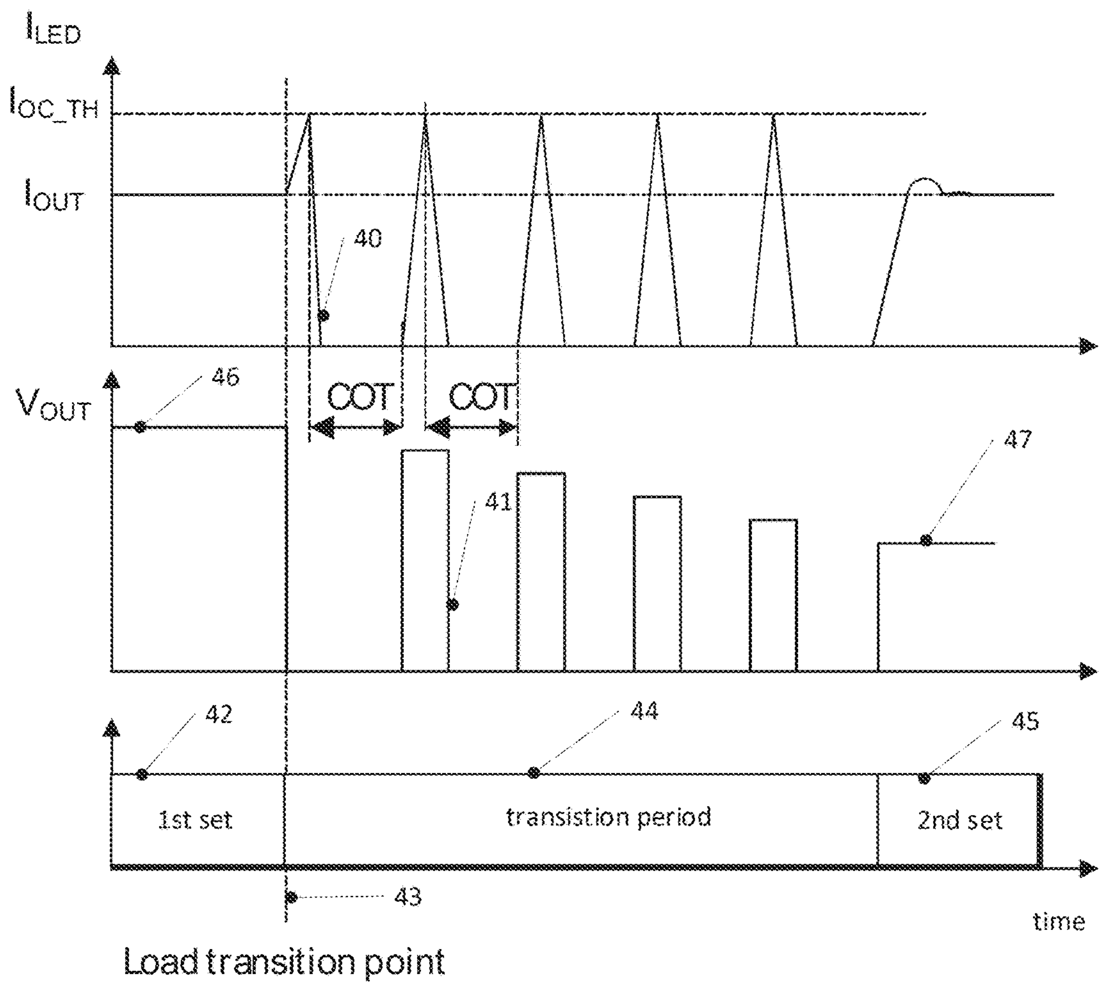
FIG. 4 is a timing diagram illustrating operation according to an embodiment.

FIG. 4 illustrates a timing diagram for a first scheme for switching the series switch off and on. In FIG. 4, a curve 40 illustrates the output current $I_{LED}$ provided to a LED arrangement, a curve 31 illustrates the output voltage $V_{OUT}$ provided to the LED arrangement, and at the bottom of FIG. 4 different phases are shown.

For the scheme of FIG. 4, the output current $I_{LED}$ is regulated to a target output current $I_{OUT}$ in any conventional manner by controlling a power converter like power converter 11 by a controller like controller 110. To this end, controller 110 receives a measure of the output voltage and/or a measure of the output current. The output current regulation may be performed in any conventional manner.

In FIG. 4, in a phase 42 corresponding to 20 in FIG. 2, a LED arrangement is operated with a first set of active LEDs, with an output voltage at a level 46 being provided. At a point in time denoted by a dashed line 43 and labeled load transition point, the LED arrangement is switched from the first set of active LEDs to the second set of active LEDs, corresponding to 21 of FIG. 1. This marks the beginning of a transition period 44. As can be seen in curve 40, this causes an abrupt rise of the output current $I_{LED}$.

When the output current reaches an upper current threshold $I_{OC\_TH}$, a series switch like series switch 13 is switched off. The upper current threshold $L_{OC\_TH}$ may correspond to an overcurrent threshold also used in normal operation, or may be a threshold specifically selected for the transition period 44. After switching off the series switch when reaching the upper current threshold $I_{OC\_TH}$, the series switch remains off a predefined time COT, after which the series switch is switched on again. This again leads to an abrupt rise in current, as shown in curve 40, until the upper current threshold $I_{OC\_TH}$ is reached, upon which the series switch is switched off again for the predefined time period COT. This is repeated several times until the output current does not reach the upper current threshold any longer, and ultimately the output current is regulated to the previous target value $I_{OUT}$. This, as seen in curve 41, leads to a gradual drop in output voltage during each "current spike" until a new output voltage level 47 for operating the second set of active LEDs in a period 45 (corresponding to 23 of FIG. 2) is reached.

During each of the spikes, an output capacitor like output capacitor 12 of a power converter used is discharged, and as the current is always kept below the upper current thresholds, damage to the LEDs may be avoided. Moreover, in systems where series switch 13 is provided anyway for example for overcurrent protection, no further hardware is required. Only some timer or counter is needed, which is provided in many controllers anyway, to measure the time period COT during which the series switch remains off.

The predefined time COT may be a fixed time or may be user configurable. For example, COT may be in a range of 100 μs to 20 ms.

Figure 5:
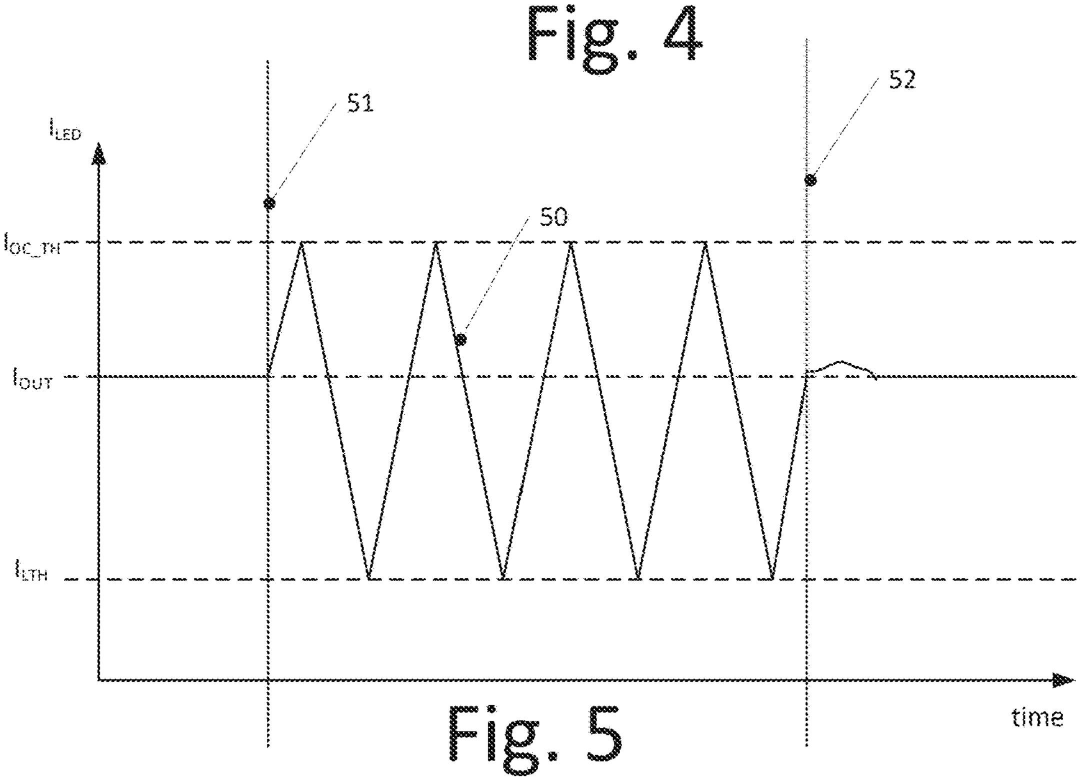
FIG. 5 is a timing diagram illustrating operation according to a further embodiment.

FIG. 5 illustrates the current through the LEDS, $I_{LED}$, to be regulated to an output current $I_{OUT}$ according to a second switching scheme. A curve 50 shows the output current. Also here, up to a load transition point indicated by a dashed line 51, a LED arrangement is operated with a first set of active LEDs, and at the load transition point a switch to a second set of active LEDs occurs. As can be seen from curve 15, as in FIG. 4 this causes an abrupt rise of the current to the LEDS $I_{LED}$.

Similar to the switching scheme of FIG. 4, when the current $I_{LED}$ reaches upper current threshold $I_{OC\_TH}$, the series switch is switched off. Unlike FIG. 4, where the series switch was switched off for a predefined time COT, in the switching scheme of FIG. 5 the series switch remains switched off until the current drops to a lower current threshold $I_{LTH}$. When the lower current threshold $I_{LTH}$ is reached, the series switch is switched on again. This is repeated until the current remains below $I_{OC\_TH}$, and the current $I_{LED}$ is regulated to the output current $I_{OUT}$ again, such that after a point in time indicated by a dashed line 52, the second set of active LEDs is operated. Also here, an output capacitor is gradually discharged.

It is to be noted that FIGS. 4 and 5 assume a series connection's of LEDs, i.e. a LED string, such that the required output current $I_{OUT}$ is the same both when the first set of LEDs is operated and when the second set of LEDs is operated. In case of different types of LEDs in both sets (for example different LED colors), the target output currents $I_{OUT}$ before and after the transition period may also be different, or instead of a current regulation a voltage regulation to output voltages appropriate for the respective set of active LEDs may be performed instead of a current regulation.

As can be seen in FIGS. 4 and 5, different switching schemes are possible for repeatedly switching the series switch off and on.

Figure 6:
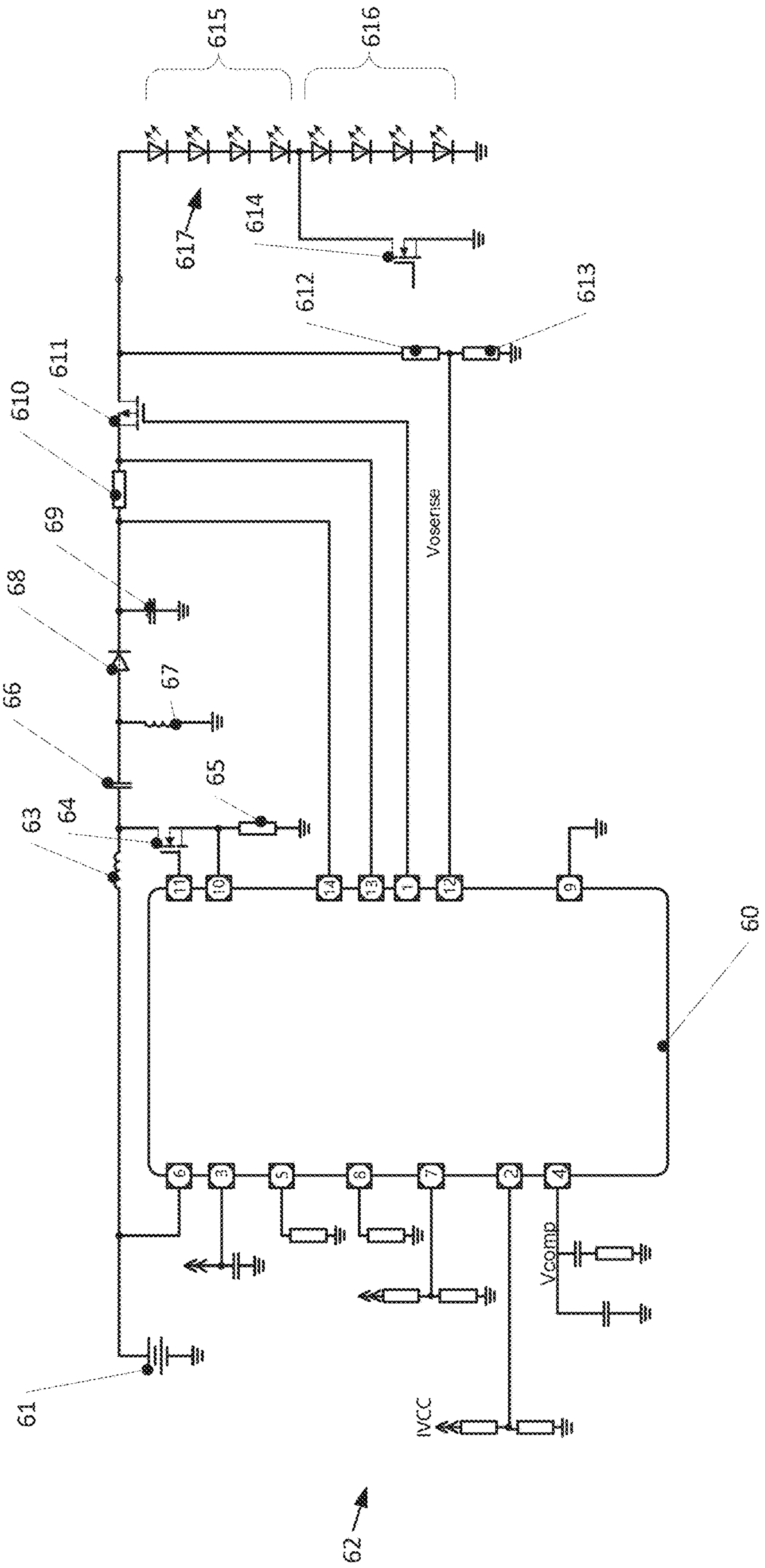
FIG. 6 is a circuit diagram of a system according to an embodiment.

FIG. 6 is a circuit diagram of a system according to a further embodiment, illustrating implementation examples for elements and components discussed above. Again, to avoid repetitions, reference will be made to previous explanations.

The system of FIG. 6 serves to supply a LED string 617 with power. In the example shown, LED string 617 includes eight LEDs, but this is merely an illustrative example, and the number of LEDs may be selected depending on application, for example depending on a required brightness.

LED string 617 includes a group of low beam diodes 615 and a group of high beam diodes 616. By switching on a switch transistor 614, high beam group 616 may be bridged such that only low beam group 615 is supplied with power and therefore active. Therefore, in this example, the complete LED string 617 is an example for a first set of LEDs (transistor switch 614 off), and low beam group 615 is an example for a second set of LEDs (transistor switch 614 on) in the embodiments discussed above, and by switching switch transistor 614 on and off, the first set (both group 615, 616) or the second set a (only group 615) may be active.

LED string 617 is supplied by power from a battery 61, for example a battery in a vehicle, via a power converter. The power converter in the example of FIG. 6 is a buck converter including a series inductor 63, a main switch transistor 64, a series capacitor 66, a shunt inductor 67, a rectifying diode 68 and an output capacitor 69. Output capacitor 69 is an example for output capacitor 12 of FIG. 1.

Main switch transistor 64 is controlled by a controller 60 wire an output terminal #11. A current through main switch transistor 64 may be measured by controller 60 using a measurement resistor 65 at a terminal #10. A current is supplied to let string 617 may be measured by controller 60 using a measurement resistor 610 at terminal #13 and #14. An output voltage output to LED string 617 is measured using a resistive divider including resistors 612, 613, which results in a sense voltage VOsense, at a terminal #12. In normal operation, controller 60 may for example operate main switch transistor 64 based on the output current measured using sense resistor 610 to regulate the output current to a target output current, for example to current $I_{OUT}$ in FIGS. 4 and 5. In other embodiments, controller 60 may regulate the output voltage to a target output voltage (for example the voltage levels 46, 47 in FIG. 4) based on VOsense. Additionally, the current measured may be used to detect overcurrent conditions, and/or VOsense may be used to detect overvoltage conditions.

A switch transistor 611 is provided as a series switch controlled by controller 60 wire a control terminal #1. Furthermore, connected to controller 60 is circuitry 62, which may serve for diagnosis and measurement purposes, as in conventional devices and systems.

As in conventional systems, switch transistor 611 may for example be used for overcurrent protection.

Apart from the operation of switch transistor 611 during a transition period when switching switch transistor 614 on, i.e. switching from the first set of active LEDs to the second set of active LEDs, the configuration and operation of the system of FIG. 6 may correspond to a conventional operation.

In the transition period, switch transistor 611 may be switched off and on repeatedly, as explained with reference to FIGS. 1 to 5. For example, the switching schemes shown in FIGS. 4 and 5 may be implemented. For the switching scheme of FIG. 4, controller 60 may compare the current measured using sense resistor 610 to an upper current threshold $I_{OC\_TH}$, or for the scheme of FIG. 5 may compare the current to thresholds $I_{OC\_TH}$ and $I_{LTH}$ and operate switch transistor 611 accordingly.

Additionally, for the scheme of FIG. 4, controller 60 may include a timer to measure the time COT of FIG. 4. Such a timer may be implemented for example as a counter counting from the points in time where the switch transistor 611 is switched off until a predefined count value has been reached. As the predefined time COT, this predefined count value may be configurable. For comparing the current through the thresholds, controller 60 may include one or more analog comparators cooperating the voltage drop over sense resistor 610 with a threshold value, or may perform the comparison in a digital manner, by digitizing the voltage drop over sense resistor 610 using an analog-to-digital converter and then comparing the resulting digital value digitally to a threshold value. Any conventional analog-to-digital converters, comparators and digital logic circuitry may be used for this.

It should be noted that the specific arrangement of FIG. 6 is merely an example. For example, as measured initially, other types of power converters than the buck converters shown may be used. Moreover, while a single LED string is shown in FIG. 6, in other embodiments a LED arrangement may also comprise a plurality of parallel LED strings. Furthermore, instead of bridging a part of the LED string as shown in FIG. 6 to switch between the sets of active LEDs, also separate sets may be provided, and a switch arrangement may be used to selectively provide a current only to one of the sets.

Some embodiments are defined by the following examples:

Example 1. A light emitting diode, LED, controller, comprising:

a control terminal to be coupled to a series switch between a power supply and a LED arrangement switchable between a first set of active LEDs and a second set of active LEDs, and a control circuit configured to, upon switching of the number of active LEDs from the first set to the second set, output a control signal at the control terminal to repeatedly switch the series switch off and on during a transition period.

Example 2. The controller of example 1, wherein the controller includes an input terminal configured to receive a measure of a current through the series switch.

Example 3. The controller of example 2, wherein the control circuit is configured such that the transition period ends when the measure indicates that the current remains below a predefined threshold.

Example 4. The controller of example 2 or 3, wherein the control circuit, for repeatedly switching the series switch off and on, is configured to switch the series switch off when the measure indicates that the current exceeds an upper threshold.

Example 5. The controller of any one of examples 2 to 4, wherein the control circuit, for repeatedly switching the series switch off and on, is configured to switch the series switch on when the measure indicates that the current falls below a lower threshold.

Example 6. The controller of any one of examples 2 to 4, wherein the control circuit, for repeatedly switching the series switch.

off and on, is configured to switch the series switch on a predefined time after switching the series switch off.

Example 7. The controller of example 6, wherein the predefined time is adjustable.

Example 8. The controller of any one of examples 1 to 7, wherein the first set of active LEDs includes a greater number of LEDs than the second LED of active LEDs.

Example 9. The controller of any one of examples 1 to 8, wherein the first set of active LEDs has a higher overall forward voltage than the second LED of active LEDs at the same current.

Example 10. A light emitting diode drive system, comprising:

a LED arrangement, a power supply configured to supply the LED arrangement with power, a series switch coupled between the LED arrangement and the power supply, and the controller of any one of examples 1 to 9.

Example 11. The system of example 10, further comprising a switch configured to bridge a part of the LEDs of the LED arrangement to switch the LED arrangement between the first number of active LEDs and the second number of active LEDS.

Example 12. The system of example 10 or 11, wherein the power supply comprises an output capacitor, wherein the repeatedly switching the series switch off and on during the transition period discharges the output capacitor.

Example 13, The system of any one of examples 10 to 12, wherein the controller is configured to control the power supply to provide a regulated output current.

Example 14. The system of any one of examples 10 to 13, wherein the LED arrangement includes one or more LED strings.

Example 15. A method of supplying a LED arrangement with power, comprising:

operating the LED arrangement with a first number of active LEDS, switching the LED arrangement from the first set of active LEDs to a second set of active LEDS, in response to the switching of the LED arrangement, repeatedly switching a series switch between a power supply and the LED arrangement off and on during a transition period, and operating the LED arrangement with the second number of active LEDs after the transition period.

Example 16. The method of example 15, wherein the method further comprises measuring a current through the series switch.

Example 17, The method of example 16, comprising ending the transition period when the current remains below a predefined threshold.

Example 18. The method of example 16 or 17, wherein repeatedly switching the series switch off and on comprises switching the series switch off when the measure indicates that the current exceeds an upper threshold.

Example 19. The method of any one of examples 16 to 18, wherein repeatedly switching the series switch off and on comprises switching the series switch on when the measure indicates that the current falls below a lower threshold.

Example 20. The method of any one of examples 16 to 18, wherein repeatedly switching the series switch off and on comprises switching the series switch on a predefined time after switching the series switch off.

Example 21. The method of example 20, wherein the predefined time is adjustable.

Example 22. The method of any one of examples 15 to 21, wherein repeatedly switching the series switch off and on discharges an output capacitor of the power supply.

Example 23. The method of any one of examples 15 to 22, wherein switching the LED arrangement from the first number of active LEDs to a second number of active LEDs smaller than the first number comprises bridging a part of the LEDs of the LED arrangement.

Example 24. The method of any one of examples 15 to 23, wherein the first set of active LEDs includes a greater number of LEDs than the second LED of active LEDs.

Example 25, The method of any one of examples 15 to 24, wherein the first set of active LEDs has a higher overall forward voltage than the second LED of active LEDs at the same current.

Example 26. The method of any one of examples 15 to 25, wherein the LED arrangement includes one or more LED strings.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A light emitting diode (LED) controller, comprising:

a control terminal to be coupled to a series switch between a power supply and an LED arrangement switchable between a first set of active LEDs and a second set of active LEDs, an input terminal configured to receive a measure of a current through the series switch, and a control circuit configured to, upon switching of a number of active LEDs from the first set to the second set, output a control signal at the control terminal to repeatedly switch the series switch off and on during a transition period, wherein the control circuit is configured such that the transition period ends when the measure indicates that the current remains below a predefined threshold.

2. The controller of claim 1, wherein the control circuit, for repeatedly switching the series switch off and on, is configured to switch the series switch off when the measure indicates that the current exceeds an upper threshold.

3. The controller of claim 2, wherein the control circuit, for repeatedly switching the series switch off and on, is configured to switch the series switch on when the measure indicates that the current falls below a lower threshold.

4. The controller of claim 1, wherein the control circuit, for repeatedly switching the series switch off and on, is configured to switch the series switch on a predefined time after switching the series switch off.

5. The controller of claim 4, wherein the predefined time is adjustable.

6. A light emitting diode (LED) drive system, comprising:

an LED arrangement, a power supply configured to supply the LED arrangement with power, a series switch coupled between the LED arrangement and the power supply, and a controller comprising:

a control terminal to be coupled to the series switch between the power supply and the LED arrangement, wherein the LED arrangement is switchable between a first set of active LEDs and a second set of active LEDs, an input terminal configured to receive a measure of a current through the series switch, and a control circuit configured to, upon switching of a number of active LEDs from the first set to the second set, output a control signal at the control terminal to repeatedly switch the series switch off and on during a transition period, wherein the control circuit is configured such that the transition period ends when the measure indicates that the current remains below a predefined threshold.

7. The system of claim 6, further comprising a further switch configured to bridge a part of the LEDs of the LED arrangement to switch the LED arrangement between a first number of active LEDs and a second number of active LEDs.

8. The system of claim 6, wherein the power supply comprises an output capacitor, wherein the repeatedly switching the series switch off and on during the transition period discharges the output capacitor.

9. The system of claim 6, wherein the controller is configured to control the power supply to provide a regulated output current.

10. A method of supplying a light emitting diode (LED) arrangement with power, the method comprising:

operating the LED arrangement with a first set of active LEDs, switching the LED arrangement from the first set of active LEDs to a second set of active LEDs, in response to the switching of the LED arrangement, repeatedly switching a series switch between a power supply and the LED arrangement off and on during a transition period, measuring a current through the series switch, ending the transition period when the current remains below a predefined threshold, and operating the LED arrangement with the second set of active LEDs after the transition period.

11. The method of claim 10, wherein repeatedly switching the series switch off and on comprises switching the series switch off when the measuring indicates that the current exceeds an upper threshold.

12. The method of claim 11, wherein repeatedly switching the series switch off and on comprises switching the series switch on when the measuring indicates that the current falls below a lower threshold.

13. The method of claim 10, wherein repeatedly switching the series switch off and on comprises switching the series switch on a predefined time after switching the series switch off.

14. The method of claim 13, wherein the predefined time is adjustable.

15. The method of claim 10, wherein repeatedly switching the series switch off and on discharges an output capacitor of the power supply.

16. The method of claim 10, wherein switching the LED arrangement from the first set of active LEDs to the second set of active LEDs comprises bridging a part of LEDs of the LED arrangement.

* * * * *